Dec. 24, 1940.  E. R. BARRETT  2,226,193
BODY HOISTING MECHANISM
Original Filed Aug. 24, 1936   4 Sheets-Sheet 1
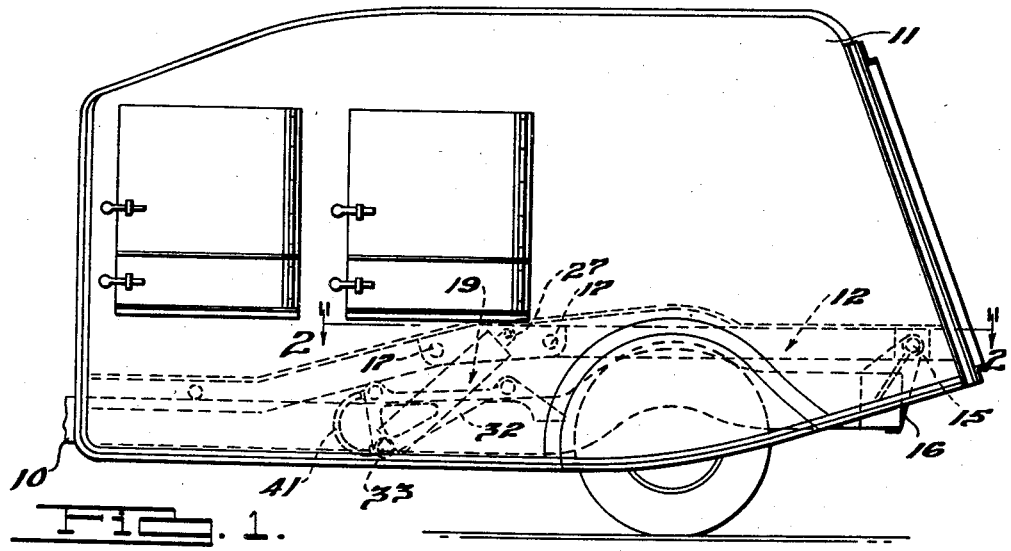
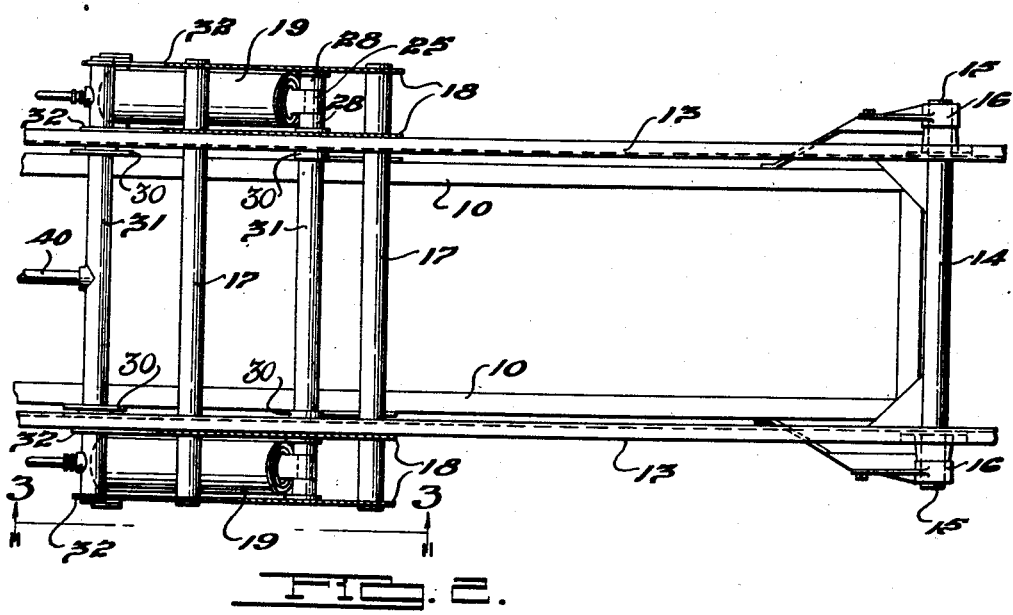
INVENTOR
Edward R. Barrett.
BY
Harness, Dickey & Pierce.
ATTORNEYS.

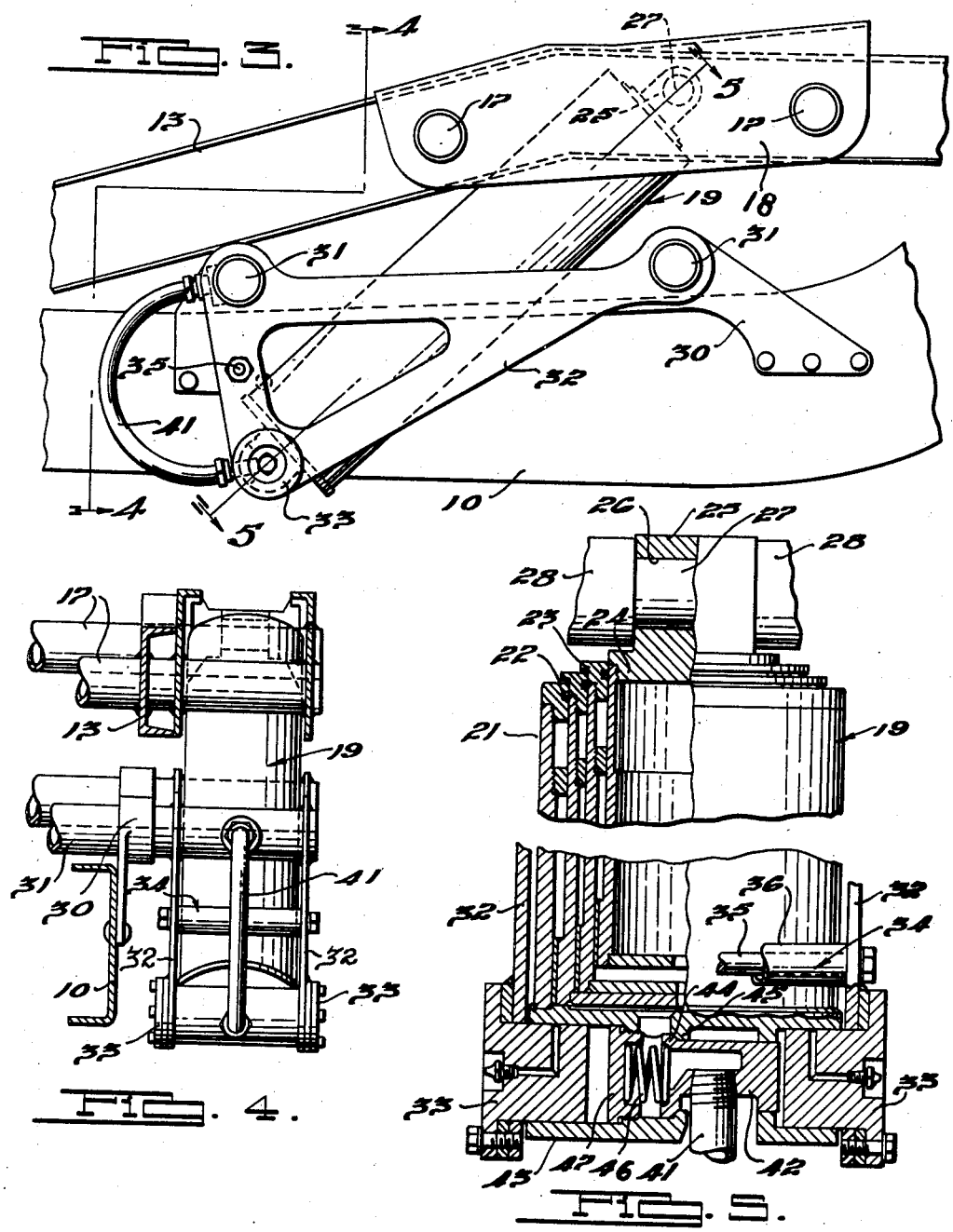

Dec. 24, 1940. E. R. BARRETT 2,226,193
BODY HOISTING MECHANISM
Original Filed Aug. 24, 1936  4 Sheets-Sheet 3
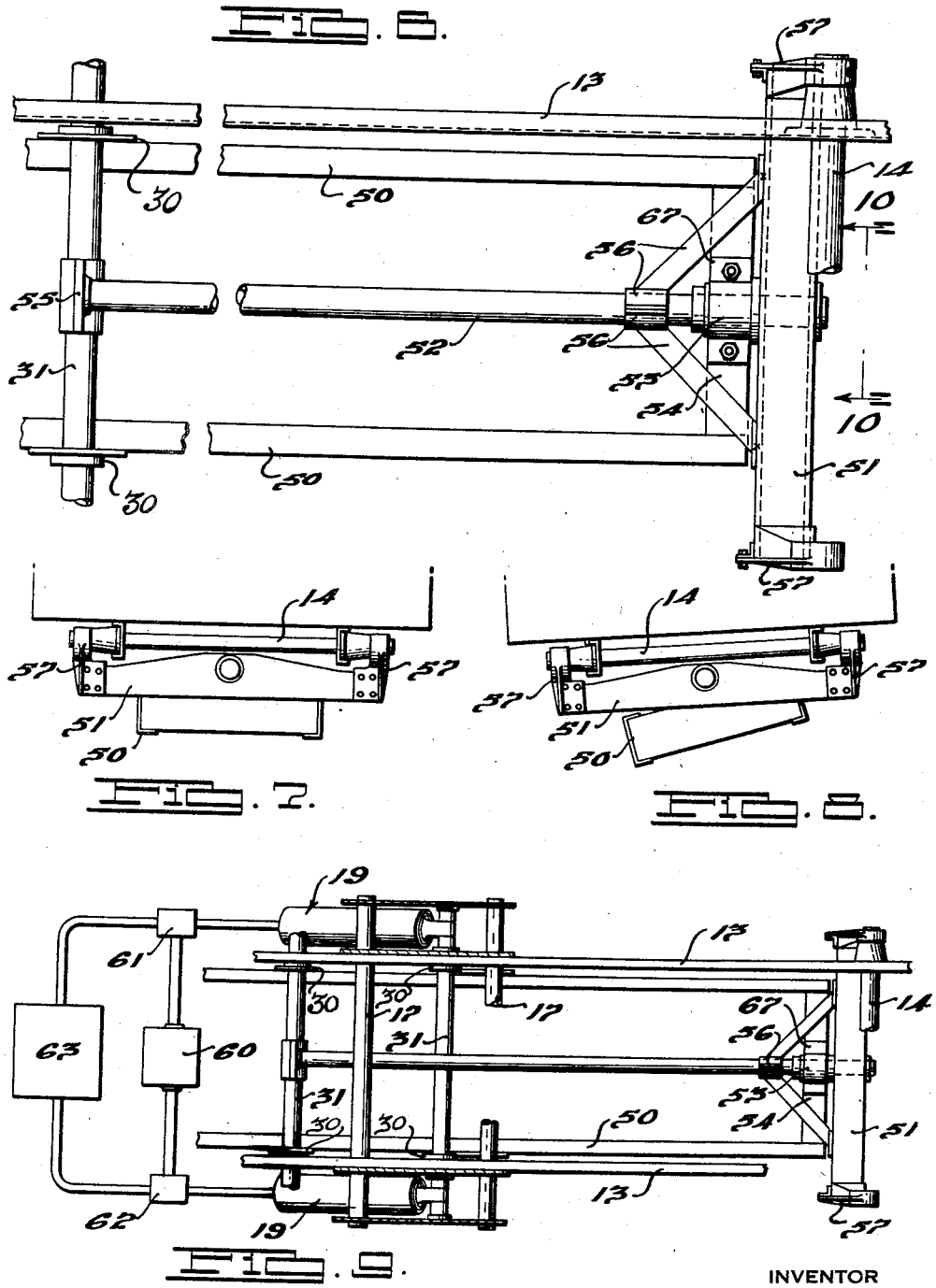
INVENTOR
Edward R. Barrett.
BY
Harness, Dickey & Pierce.
ATTORNEYS.

Dec. 24, 1940.　　　　E. R. BARRETT　　　　2,226,193
BODY HOISTING MECHANISM
Original Filed Aug. 24, 1936　　　4 Sheets-Sheet 4
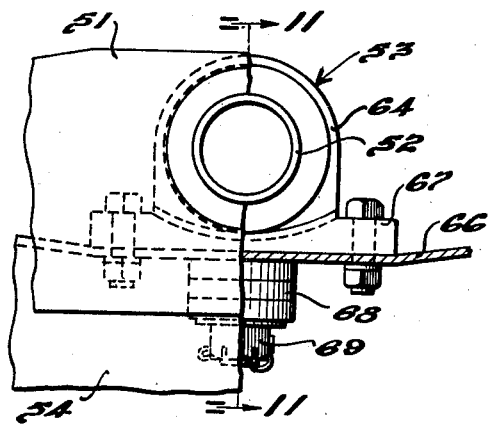
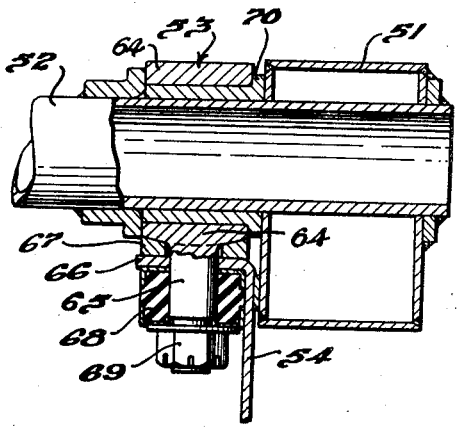
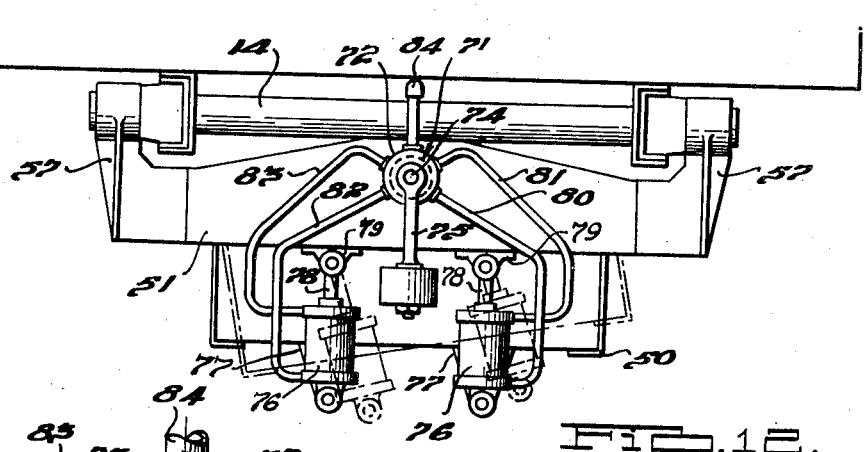
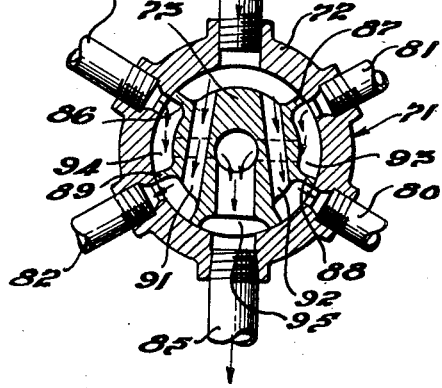
INVENTOR
*Edward R. Barrett*
BY
*Harness, Dickey & Pierce*
ATTORNEYS.

Patented Dec. 24, 1940

2,226,193

UNITED STATES PATENT OFFICE 2,226,193

BODY HOISTING MECHANISM

Edward R. Barrett, Detroit, Mich., assignor to Gar Wood Industries, Inc., Detroit, Mich., a corporation of Michigan Original application August 24, 1936, Serial No. 97,491. Divided and this application November 2, 1938, Serial No. 238,427

5 Claims. (Cl. 280—6)

This application is a division of applicant's prior copending application, Serial Number 97,491, filed August 24, 1936, now Patent No. 2,142,089, issued January 3, 1939.

My invention relates to method and means for tilting a dump body, and particularly to a hydraulic hoist and the method and structure for connecting one end of the hoist to the body in a manner to eliminate the twisting of the body during the tilting movement.

In the patent to L. S. Wood No. 2,034,544, issued March 17, 1936, and assigned to the asignee of the present invention, a support for spaced hydraulically actuated lifting devices is illustrated, described and claimed, certain features of which are embodied in the present invention and disclosure. An outboard support is formed by a pair of plates of triangular shape, two corners of the plate being secured to projections on the chassis frame of the vehicle, while a third corner provides pivotal support for one end of the hydraulic device. The outboard support for the hydraulic device provides a greater degree of stability to the dump body during and after the raising operation.

In practicing my present invention, I extend the inventive concept of the above mentioned patent by providing greater stability between the dump body and the hydraulic device by substantially eliminating the twist which occurs to the frame of the body when one side is loaded a greater amount than the other. When fluid is delivered to the hydraulic devices through a central conduit and when the load in the body is evenly distributed, the volume of fluid entering each of the devices will be equal and there will be no tendency of the body to tilt laterally. When a greater load is disposed on one side of the body than on the other, the pressures will attempt to equalize in the cylinders, causing a greater volume of fluid to enter one of the hydraulic devices than the other, resulting in the twisting of the frame and body.

The invention is further novel in that a rigid coupling is provided between the fluid conduit and the cylinder head of the hydraulic device, which permits the hydraulic device to oscillate on its trunnion and at the same time effectively seal the passage for the fluid. An arcuate metal conductor is utilized which is connected into an element which is pivotally aligned with the trunnion of the hydraulic device. A spring is employed, along with the fluid pressure, for urging the element in one direction against a seat. With this construction, the flexible conduit heretofore required is entirely eliminated.

Further novelty is provided by the provision of means for preventing the tilting of the body when the chassis frame tilts due to the unlevel position of the wheels and also, in some instances, due to the uneven loading of the body. This I accomplish by mounting the body on a bolster which is rigidly connected to the front end of the chassis frame by a torque tube, the rear end of which rests upon the rear portion of the chassis frame in such manner that the bolster may tilt relative thereto. The longitudinally extending torque tube will resist twisting when the rear portion of the chassis frame twists independent of its front end and, as a result, the bolster will remain substantially level.

Still further novelty of the invention embodies the use of hydraulic or other means for causing the bolster to positively resist the tilting action of the chassis frame when the chassis frame becomes twisted. Hydraulic cylinders may be employed having the rams universally connected to the bolster on each side of the center line thereof and so interconnected through a valve that when the bolster becomes tilted due to the tilting of the chassis frame, fluid will be supplied to the cylinder on the low side so as to extend the ram and cause the bolster to assume substantially a horizontal position. This position may be controlled by leveling means, so that irrespective of the amount of tilt produced in the chassis frame, the bolster, and therefore the body, will be retained substantially horizontal. Such apparatus would also be available in the presence of uneven loading to cause the bolster to always assume a horizontal position in the presence of an unbalanced load.

Accordingly, the main objects of my invention are: to interconnect pairs of tubular extending braces of a frame with plates which provide pivotal supports for one end of hydraulic tilting devices, to conduct a fluid through one of the tubular braces into the head of a cylinder, which is pivotally mounted thereon by means of a solid arcuate conduit which is preferably made of spring material; to connect a conduit to a pivotal element having a seating portion which engages a seat in the head of a hydraulic device; to seal the pivotal end of a conduit to a seat of a hydraulic device by the pressure of the fluid in combination with that of a spring; to provide a support for a body which is independent of the chassis frame; to provide an independent support for a body which is connected to the chassis frame through a torque tube to permit the tilting of the support independent of the chassis frame; to provide means for positively retaining a separate support for the body in a horizontal position independent of the angular position which the chassis frame may assume; to provide means for retaining a body level independent of the angular positions the chassis frame may assume; and, in general, to provide a support for a hydraulic device of a tiltable body, which prevents the body from twisting when being tilted, and which is simple in construction and economical to manufacture.

Other objects and features of novelty of my invention will be either specifically pointed out, or will become apparent when referring, for a better understanding of my invention, to the following description taken in conjunction with the accompanying drawings, wherein:

Figure 1 is a broken view of an automotive vehicle having a tiltable body thereon, which embodies the features of my invention;

Fig. 2 is an enlarged sectional view of the structure stated in Figure 1, taken on the line 2—2 thereof;

Fig. 3 is an enlarged broken view of the structure illustrated in Figure 2, as viewed from a position indicated by the line 3—3 thereof;

Fig. 4 is a sectional view of the structure illustrated in Figure 3, taken on the line 4—4 thereof;

Fig. 5 is an enlarged view, partly in section, of the structure illustrated in Figure 3, taken on the line 5—5 thereof;

Fig. 6 is a broken plan view of structure, similar to that of Figure 2, showing a further form which my invention may assume;

Fig. 7 is a reduced end view of the structure illustrated in Figure 6, with parts in level position;

Fig. 8 is a view of structure, similar to that illustrated in Figure 7, with the chassis frame in tilted position;

Fig. 9 is a view of structure, identical to that illustrated in Figure 6, showing, in addition thereto, a still further form which my invention may assume;

Fig. 10 is an enlarged broken view of the structure illustrated in Figure 6, with parts in section, as viewed from line 10—10 of Figure 6;

Fig. 11 is an enlarged broken sectional view of the structure illustrated in Figure 10, taken on the line 11—11 thereof;

Fig. 12 is an enlarged end view of structure, identical to that illustrated in Figures 6, 7 and 8, showing in addition thereto, a still further form which my invention may assume; and Fig. 13 is a sectional view of the valve illustrated in Figure 12.

In Fig. 1, I have illustrated a chassis frame 10 of an automotive vehicle having mounted thereon a tiltable body 11, which is supported on a body frame 12. The body 11 is herein illustrated as being a garbage type of enclosed body, commonly employed for hauling refuse. The body is of heavy construction and large capacity, requiring material effort to effect its tilting to dump the contents thereof.

The frame 12 is formed of longitudinally extending channel members 13, which are interconnected at their rear ends by a tubular element 14. The ends 15 of the tubular element 14 form trunnions engaged by the bearings provided on outwardly and upwardly extending brackets 16 secured to the rear end of the chassis frame 10.

This connection between the ends 15 and the brackets 16 provides the pivot, about which the body 11 is tilted when the opposite end of the frame 12 is raised. The front end of the frame 12 is provided with a pair of tubular elements 17 which are similar to the tubular element 14 with the exception that they are of somewhat greater length, projecting a greater distance beyond the outer face of the channel members 13.

A pair of plates 18 is supported on the ends of the tubular elements 17 in spaced relation to each other, a distance slightly greater than the maximum diameter of the hydraulic devices 19, which are disposed therebetween. The hydraulic devices 19 embody a plurality of telescoping cylinders 21, 22, 23 and 24, as illustrated in Figure 5, each one of which is projectable relative to the other to provide a maximum extension to the hydraulic devices. The innermost cylinder 24 is provided with an extension 25, having an aperture 26 therein, through which a pin 27 extends. The pin also extends through a pair of bosses 28, provided on either side of the extension 25 and through the plates 32 to provide a pivotal connection between the cylinder 24 and the frame 12. By supporting the ends of the hydraulic devices 19 on the tubular elements 17, the twisting of the frame 12 when being raised is substantially eliminated through the torsional resistance of the tubular elements 17. The tubular elements resist the twist which must occur to permit the channel element 13 to twist relative to each other.

A similar pair of tubular elements 31 are supported by brackets 30 to the side members of the chassis frame 10, and extend in a similar manner beyond their outer surfaces to provide outboard supports. A pair of plates 32 is supported on the projecting ends of the tubular elements 31, and have trunnions 33 upon which one end of the hydraulic ram 19 is pivotally supported. Suitable cross bracing elements 34 may be employed to interconnect the plates 32 to prevent them from spreading when a load is applied by the hydraulic device. In Figure 5, I have illustrated the spacing element 34 as embodying a tube 36, through which a bolt 35 extends. The plates 32 are drawn into position as spaced by the tubular element 36 when the bolt 35 is tightened.

By mounting the hydraulic devices on outboard bearings at the sides of the body and chassis frame, not only is more stability obtained, but more room is provided within the body than when the devices are otherwise mounted. The rear portion of the frame 12 is offset slightly from the front portion to provide clearance for the wheel housings, and this offset portion provides the spaces in which the hydraulic devices are mounted without reducing the area of useful load, Referring more particularly to Figures 2, 3 and 4, the frontmost tubular element 31 is employed to conduct the fluid delivered thereto by a pipe 40. Arcuate conductors 41 are secured to the outboard extending portions of the tubular elements 31. The conductors 41 are preferably made of spring steel to embody a certain amount of resiliency. The opposite end of the conductor 41 is threaded into a valve 42 pivotally disposed in a head 43 of the hydraulic device 19, as illustrated more particularly in Figure 5. The valve 42 has a seat 44 which engages a seat 45 provided in the head when the boss 42 is urged to the right, as viewed in the figure. A spring 46, abutting against a plug 47, urges the boss 42 to the right and therefore upon its seat 45. The fluid pressure in the system assists the spring in forcing the seat 44 onto the seat 45, and thereby provides a greater sealing effect as the fluid pressure increases. During operation the valve 42 remains stationary while the hydraulic device 19 oscillates on its trunnion 33, and thereby eliminates a flexible tubular connection which heretofore was necessary. In case the valve 42 is seized and prevented from turning, the resilient conductor 41 may spring sufficiently to permit the hydraulic device 19 to oscillate without damaging the conductor.

In Figure 6, I have illustrated fragmentarily a generally rectangular chassis frame 50 having a transverse bolster 51 rigidly secured to the rear end of a longitudinally extending, medially disposed torque tube 52. The torque tube 52 is rigidly welded to the central portion of the bolster 51 and is journaled in and projects through a sleeve 53 which is rigidly attached to the rear cross brace 54 of the chassis frame 50. The front end of the tube 52 by a bracket 55 is rigidly secured to the medial part of the frontmost laterally disposed tube 31, the ends of which are rigidly secured to the chassis frames 50 by brackets 30. Suitable diagonally disposed bracing arms 56 encompass the torque tube 52 adjacent its rear end and are secured to the bolster 51 near the ends thereof. This provides a stability to the bolster relative to the torque tube.

When the rear end of the chassis frame 50 is twisted or warped relative to the front end of the chassis frame, as shown in Fig. 8, the bolster 51 is maintained in a level or horizontal position due to its rigid attachment to the torque tube 52, which is journaled at its rear end on the rear cross member of the chassis frame and rigidly attached to the tube 31 at its forward end. The torque tube 52 resists torsional twisting and thereby maintains the bolster 51 substantially parallel to the tube 31, which tube is connected to the chassis frame 50 adjacent its front end. The ends of the bolster 51 are provided with brackets 57 which pivotally engage the end of the tube 14 provided on the frame 13 which supports the body. The body may be raised about the pivots formed between the ends of the tube 14 and the brackets 57 while a resistance to tilting is offered to the body and the bolster by the torque tube when the chassis frame is tilted, as illustrated in Figure 8. This resistance to tilt is aided materially by having the torque tube supported at its front end near the front end of the chassis frame since the weaving of the chassis frame occurs substantially from a central point so that the support on the frontmost tube 31 will not be affected by the tilting or warping which occurs at the rear end of the chassis frame. Since the front portion of the chassis frame which supports the tube 31 is not tilted, the inherent resistance of the tube 52 to twist will prevent the bolster 51 from tilting materially when the rear end of the chassis frame is tilted. The normal position of the chassis frame and bolster is illustrated in Figure 7, while the tilted relation thereof will be noted in Figure 8, as pointed out hereinabove.

A further novelty is provided to the inventive concept as described and illustrated in Figures 6, 7 and 8 by the addition of the hydraulic connection to the hoists 19, as illustrated in Figure 9. A power take-off device 60 drives a pair of independent pumps 61 and 62 which supply a uniform volume of fluid to the hydraulic devices 19. The fluid may be pumped from and returned to a reservoir 63 and by accurately providing the same volume of oil to both of the cylinders, irrespective of the amount of weight which may be distributed unevenly to one side or the other of the body, the raising of the body will always occur with the body in lateral horizontal position. That is to say, the body will be prevented from tilting due to uneven loading by the uniform supply of fluid to both of the cylinders. While one cylinder may have a greater load applied thereto than the other, the extension of the rams of the cylinders will be uniform and tilting will thereby be prevented.

In Figures 10 and 11, I have illustrated the sleeve 53 as embodying an annular portion 64 having a stud 65 extending therefrom providing a structure in the nature of an eye bolt. The stud is suported on the flange 66 of the cross member 54 of the chassis frame with the sleeve 53 resting on a dish-shaped bracket 67 which is bolted or otherwise secured to the upper surface of the flange 66. A resilient annular element 68, herein illustrated as being made of rubber, surrounds the stud 65 and is secured by a nut 69 threaded on the lower end of the stud 65 so as to cause the elements 68 to bear against the under side of the flange 66. In this construction, the torque tube 52 is free to turn within the sleeve 53 on a bearing 70 provided thereon and is able to turn slightly in any direction due to the fact that the sleeve 53 is resting in the cup-shaped washer 67 and in view of the fact that the support for the stud is resilient through the employment of the element 68. The sleeve is therefore mounted universally for a small movement to permit the complete flexing of the chassis frame independent of the torque tube 52 and the bolster 51.

Referring to Figures 12 and 13, I have illustrated a still further form which my invention may assume. In the construction therein illustrated, the chassis frame, body frame, bolster, torque tube and connections are the same as illustrated in Figs. 6, 7 and 8. In this embodiment, however, a valve 71 has its casing 72 mounted on the bolster 51 while the valve core 73 is free to turn therein. The valve core 73 has a shaft 74 extending therefrom to which the upper end of a pendulum 75 is rigidly attached. A pair of hydraulically actuated cylinders 76 are pivotally supported by brackets 77 to the chassis frame 50. Piston rods 78, extending from the cylinders 76, have their outer ends pivotally secured by brackets 79 to the bolster 51. Conduits 80 and 81 connect opposite ends of one of the cylinders 76 to one side of the valve 71, while conduits 82 and 83 connect opposite ends of the other cylinder 76 to the valve 71. An intake conduit 84 supplies fluid to the valve, while a return conduit 85 conducts the fluid from the valve to a reservoir.

The valve 73 is provided with a plurality of vanes 86, 87, 88 and 89 which make sealing contact with the interior surface of the cylindrical bore of the valve casing 71. Passageways 91 and 92 connect the supply conduit 84 with the under side of the vanes 89 and 88, respectively. Between the vanes 87 and 88 and 86 and 89, return orifices 93 and 94 are provided, communicating through an orifice 95 with the return conduit 85.

When the bolster and chassis frame are in horizontal position, the valve is in the position illustrated in Figure 13. In this position fluid flows through the conduit 84 through the orifices 91 and 92 into the conduits 82 and 80, respectively, and into the lower end of the cylinders 76.

The fluid provided above the piston will be exhausted through the conduits 83 and 81 into the orifices 94 and 93 and out through the exhaust conduit 85. When the bolster is tilted to the left, due to the uneven loading of the body or due to the tilting of the chassis frame, the housing 72 of the valve will be turned counter-clockwise, as viewed in Figure 13, causing the vane 87 to pass the mouth of the conduit 81 and the vane 88 to pass the mouth of the conduit 80. In this arrangement, fluid under pressure will be delivered to the under side of the piston of the cylinder, illustrated on the left as viewed in Figure 12, to cause an upward pressure to be provided between the bolster and the chassis frame. At the same time, fluid will be delivered into the conduit 81 and will be exhausted from the conduit 80 below the piston, in the cylinder 76 on the right hand side of the bolster, as viewed in Figure 12. In this arrangement, the bolster has an upward force provided thereto by the left hand cylinder while a downward force is provided thereto by the right hand cylinder to cause the bolster to rotate about the torque tube 52. When a vertical position is approached, the relation between the valve 73 and its casing 72 will be that illustrated in Figure 13, and further compensating action will terminate. When the body tends to tilt toward the right, as viewed in Figure 12, the opposite action of the cylinders will occur; that is to say, the right hand cylinder will tend to raise the bolster while the left hand cylinder will tend to lower the bolster, so that the body will tilt back in a counter-clockwise direction toward normal position.

It is to be understood that either structure can be employed to compensate for the tilting of the body, and that means other than hydraulic can be utilized for this purpose. Valves or other means may be employed between the chassis frame and body to control the leveling mechanism and prevent the tilting of the body when separation occurs between the chassis frame and body as the chassis frame tilts. It is to be understood that the simple hydraulic means embodying a pair of cylinders and a pendulum actuated valve is employed for the purpose of illustration, and that I do not desire to be limited only to such structure.

While I have described and illustrated several embodiments of my invention, it will be apparent to those skilled in the art that various changes, omissions, additions and substitutions may be made therein without departing from the spirit and scope of my invention as set forth in the accompanying claims.

What is claimed is:

1. An automotive vehicle embodying a chassis frame, a body, a torque tube interconnecting said body and said chassis frame, said torque tube being secured to the chassis frame near the front end thereof and to the body near the rear end thereof, and means for pivotally supporting said tube on the rear end of said chassis frame.

2. An automotive vehicle embodying a chassis frame, a body, a torque tube interconnecting said body and said chassis frame, said torque tube being secured to the chassis frame near the front end thereof and to the body near the rear end thereof, and a universally movable bearing secured to the rear portion of said chassis frame through which said tube extends.

3. An automotive vehicle having a chassis frame, a torque tube having one end rigidly attached to said chassis frame adjacent one end thereof, means for pivotally mounting the other end of said torque tube on said chassis frame adjacent the other end thereof, and a body supporting bolster rigidly attached to the pivoted end of said torque tube.

4. An automotive vehicle having a chassis frame, a torque tube having one end rigidly attached to said chassis frame adjacent one end thereof, means for pivotally mounting the other end of said torque tube on said chassis frame adjacent the other end thereof, a body supporting bolster rigidly attached to the pivoted end of said torque tube, and a dump body pivotally mounted on said bolster.

5. An automotive vehicle having a chassis frame, a torque tube having one end pivotally mounted on a longitudinally extending axis upon and adjacent to one end of said chassis frame, means for rigidly attaching the other end of said torque tube to said chassis frame adjacent the other end thereof, and a body supporting bolster rigidly attached to the pivoted end of said torque tube whereby said bolster is urged by said torque tube to maintain a position in a plane substantially parallel to the plane of said chassis frame at the point of rigid attachment of said torque tube.

EDWARD R. BARRETT.